May 8, 1962 S. T. VOLL 3,032,913
APPARATUS FOR CONTROLLING THE SLIDABLE ENGAGEMENT OF A
FISHING FLOAT WITH RESPECT TO A FISHING LINE
Filed Nov. 21, 1960

*INVENTOR.*
SAMUEL T. VOLL

United States Patent Office 3,032,913
Patented May 8, 1962

3,032,913
APPARATUS FOR CONTROLLING THE SLIDABLE ENGAGEMENT OF A FISHING FLOAT WITH RESPECT TO A FISHING LINE
Samuel T. Voll, Great Falls, Mont., assignor of one-tenth to Gadget-Of-The-Month Club, Inc., North Hollywood, Calif., a corporation of California
Filed Nov. 21, 1960, Ser. No. 70,682
5 Claims. (Cl. 43—44.91)

The present invention consists of apparatus for controlling the slidable engagement of a fishing float with respect to a fishing line, whereby the degree of frictional snubbing action exerted against the fishing line can be controllably adjusted between zero and a maximum value suitable for different types of fishing conditions under which the apparatus will be used.

In prior art fishing apparatus, it is conventional to use a fishing line attached to a fishing pole and reel, with the fishing line being provided with a sinker, a hook (which may be baited or which may consist of various types of lures, or the like) and a float fixed to the line at an appropriate level with respect to the sinker. This is rather difficult to cast because of the fact that all of the elements connected to the fishing line are not adjacent to the tip thereof, the float being spaced a considerable distance back from the tip thereof. Furthermore, after casting, the float may not be positioned the proper distance above the sinker for the depth of water and the conditions of use.

The apparatus of the present invention completely meets and overcomes the above-mentioned prior art problem, in that it allows the float to be slidably moved along the line to a point closely adjacent to the sinker, with the hook being also positioned closely adjacent thereto, so that the entire assembly can be conveniently reeled up close to the tip of a fishing pole just prior to casting, in a manner which greatly facilitates a casting operation. After casting, the sinker will drop to the bottom and the float will rise along the fishing line, by reason of its buoyancy, until it reaches the surface, at which level it will remain, because it will be held to the fishing line by a snubbing or frictional engagement therewith of a degree determined by the initial adjustment of one of the magnetic elements of a pair of magnetic elements comprising a portion of the apparatus of the present invention. This means that, if one is casting in relatively still or placid water, such as in a lake, or the like, the initial adjustment of the controllably adjustable magnetic element would be such that a very small amount of, or a minimum degree of, friction would exist between the opposed magnetic elements and the fishing line, because nothing more than such a minimum engagement is required to keep the float virtually directly over the sinker in such placid water. On the other hand, if one is casting in relatively rapidly moving water, such as in a stream, or the like, the initial adjustment of the controllably adjustable magnetic element would be such that a very large amount of, or a maximum degree of, friction would exist between the opposed magnetic elements and the fishing line, because such a maximum engagement is required to keep the float virtually directly over the sinker in such rapidly-moving water. If maximum frictional engagement did not exist, when fishing in such rapidly-moving water, the float would tend to slide along the fishing line, while moving laterally downstream along the surface of the water, which is undesirable for this type of fishing. It should be understod that the above general description primarily applies to the apparatus of the present invention when used for bottom fishing or deep fishing. However, it should be noted that the apparatus of the present invention may also be used for surface fishing by merely removably fastening an extended lateral buoyant fishing line and one or more hooks to the float.

It is an object of the present invention to provide apparatus for controlling the degree of engagement of a fishing float with respect to a fishing line, of the character referred to above, which is of extremely simple, cheap, foolproof construction, such as to be conducive to widespread use thereof.

It is a further object to provide apparatus of the character set forth above, in combination with a fishing float.

Further objects are implicit in the detailed description which follows hereinafter and will be apparent to persons skilled in the art after a careful study thereof.

For the purpose of clarifying the nature of the present invention, two exemplary embodiments are illustrated in the hereinbelow-described figures of the accompanying single drawing sheet and are described in detail hereinafter.

Figure 7:
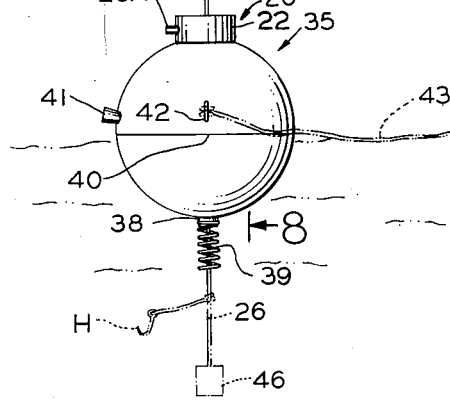

FIG. 7 is a fragmentary view illustrating the position of the apparatus of the present invention when mounted with respect to a fishing float and a fishing line for holding said float with respect to said line in the position illustrated substantially directly over the leader (which is shown shortened for drawing space conservation reasons) and one bottom or deep water fishing hook exemplary of the several which may be employed and directly over the sinker. This comprises the arrangement for bottom or deep water fishing. However, this view also shows an arrangement for surface fishing which may be employed simultaneously with or as an alternative to the bottom fishing arrangement. This surface fishing arrangement includes the floating lateral line and baited hook carried thereby.

Figure 8:
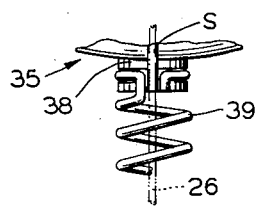
Figure 3:
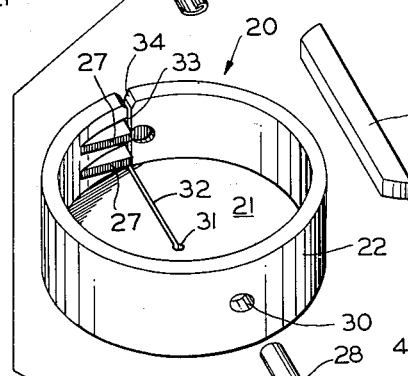
FIG. 3 is an enlarged oblique exploded view showing the controllable engagement apparatus of the present invention prior to being mounted in association with a fishing float and also prior to assembly.

FIG. 8 is an enlarged fragmentary elevational view of the bottom portion of the fishing float and one form of alignment member extending downwardly therefrom in aligned relationship with respect to the vertical aperture-defining means, whereby to prevent kinking or twisting of the fishing line extending downwardly therefrom.

Figure 9:
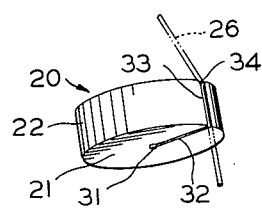

FIG. 9 is an exterior oblique view illustrating the use of a slot carried by the housing, which facilitates the engagement of a fishing line between the opposed magnetic members.

Figure 10:
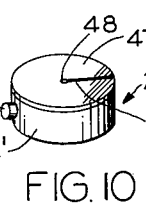

FIG. 10 is a reduced-size oblique view illustrating a slight modification of the controllable engagement means of the present invention, wherein it is provided with apertured and slotted cover means.

Referring to FIGS. 1–9 for exemplary purposes, one illustrative embodiment of the invention takes a typical exemplary form, wherein it comprises a housing means, indicated generally at 20, comprising a substantially flat disc-shaped base member 21 and a circular upstanding side wall 22, in the specific form illustrated. The housing means 20 is provided with two relatively movable magnetic elements, indicated at 23 and 24, and mounted by the housing in opposed spaced closely adjacent relationship in a manner such as to define therebetween a through passage 25 (best shown in FIG. 5) for a longitudinal fishing line, shown fragmentarily and in broken line form at 26, to pass therethrough between the opposed magnetic elements 23 and 24 whereby the longitudinal fishing line 26 will be frictionally engaged and snubbed in a manner inhibiting longitudinal movement thereof as a direction function of the magnetic attractive force between the two magnetic elements 23 and 24.

Figure 4:
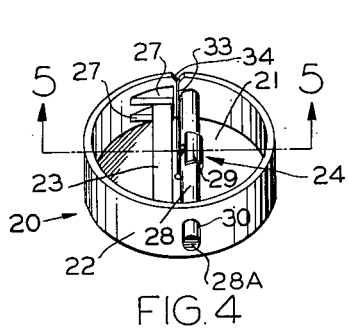
FIG. 4 is a smaller-scale oblique view of the apparatus of FIG. 3 after assembly but prior to being placed in operative relationship with respect to a fishing float.
Figure 5:
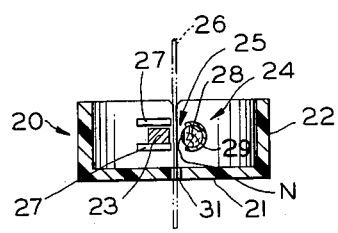
FIG. 5 is a sectional view taken in the direction of the arrows 5—5 of FIG. 4 and additionally shows fragmentarily and in broken lines a portion of a fishing line passing between the opposed magnetic elements, which are in minimum engagement position.
Figure 6:
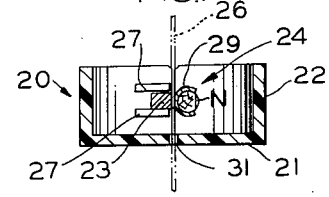
FIG. 6 is a view similar to FIG. 5, but shows the opposed magnetic elements after the manually adjustable one thereof has been adjusted into a position of substantially greater frictional engagement with respect to the fishing line.

In the specific example illustrated, the magnetic element 23 comprises a permanent magnet slidably mounted between bracket means comprising vertically spaced guide members 27 carried by the circular side wall 22 on opposite sides thereof where to transversely slidably mount the permanent magnet 23 for movement transversely toward and away from the through passage 25. In the specific example illustrated, the other magnetic element, indicated generally at 24, is a composite element consisting of a cylindrical core member or rotary mounting shaft 28 of non-magnetic material and a curved sheet of ferromagnetic material 29 varying in mass as a function of its circumferential position around the rotatable mounting shaft 28, whereby axial rotation of the rotatable mounting shaft 28 (made possible by the extended end 28A thereof) will controllably move a greater or lesser quantity of the curved ferromagnetic sheet of material 29 into closely adjacent position opposite the slidably movably mounted magnetic element 23 comprising the permanent magnet, whereby to controllably adjust the magnetic attractive force therebetween and the degree of frictional snubbing action exerted against the longitudinal fishing line member 26. FIGS. 4 and 5 illustrate the rotary mounting shaft 28 so positioned, by reason of the adjustment end 28A thereof, as to minimize the magnetic attractive force between the magnetic elements 23 and 24, whereby to minimize the degree of frictional snubbing action exerted against the fishing line 26. On the other hand, FIG. 6 shows the rotary mounting shaft 28 after it has been rotated substantially 180 degrees from the position shown in FIGS. 4 and 5 into a position where a considerable mass of the ferromagnetic sheet of material 29 is closely adjacent to the slidably mounted permanent magnet 23, which is, therefore, very powerfully attracted in a manner such as to provide a considerable degree of frictional snubbing action upon the fishing line 26. Further rotation of the rotary mounting shaft 28, in a clockwise direction as viewed in FIG. 6, through approximately an additional 90 degrees will place it in a position wherein the greatest possible magnetic attractive force is exerted between the magnetic elements 23 and 24, whereby to exert the greatest possible frictional snubbing action on the fishing line 26. It should be noted that one end of the rotary mounting shaft 28 is rotatably mounted in the far portion of the side wall 22, as viewed in FIGS. 3, 4, 5, and 6, while the near actuating end 28A thereof extends through a hole 30 in a near portion of the circular side wall 22, as viewed in FIGS. 3, 4, 5, and 6.

Figure 1:
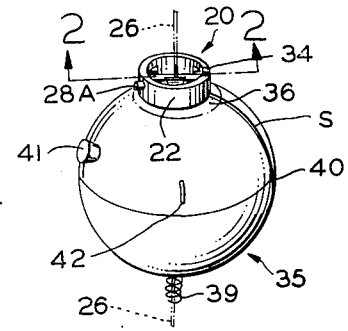
FIG. 1 is an oblique view showing one exemplary form of the present invention in mounted relationship with respect to a hollow spherical fishing float and in controllable frictional engagement with respect to a fishing line (shown fragmentarily in broken lines).
Figure 2:
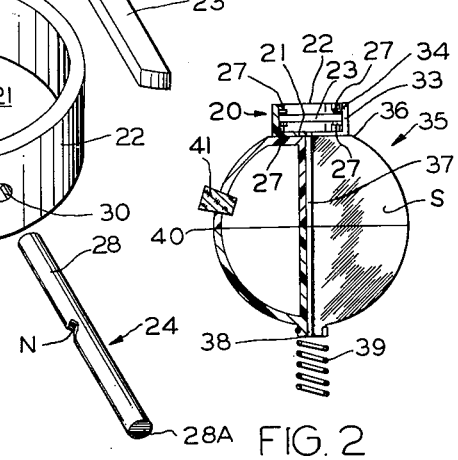
FIG. 2 is a sectional view taken in the direction of the arrows 2—2 of FIG. 1 (with the fishing line removed).

The housing means 20 is provided with egress or aperture-defining means for the longitudinal fishing line so that it may pass between the opposed magnetic elements to a position exterior of the housing means and, as shown in FIGS. 1, 2, and 7, through a longitudinal aperture-defining means in a fishing float. In the specific example illustrated, said egress and aperture-defining means includes a central aperture 31 at the center of the bottom wall 21 of the housing, which communicates with radial slot means 32, which communicates with the upstanding slot means 33 in the circular side wall 22, which terminates in a notch 34 at the top thereof. This structure facilitates the quick and easy engagement and disengagement of the fishing line 26 with respect to the housing 20, as best shown in FIG. 9, whereby the fishing line 26 can be placed in operative position between the opposed magnetic elements as shown in FIGS. 5 and 6.

In the specific form of the invention illustrated, the housing may be appropriately mounted with respect to a hollow spherical fishing float, indicated generally at 35 in FIGS. 1, 2, and 7. This may be done by cementing or otherwise suitably affixing the bottom wall 21 of the housing to a flat portion 36 at the top of the float 35, or they may merely be placed in mechanical abutment under certain circumstances of use. When mounted with respect to the fishing float 35, the aperture 31 at the bottom of the housing 20, through which the fishing line 26 passes, is aligned with aperture-defining means 37 passing centrally through the hollow spherical float 35 to a projecting egress portion 38 thereof at the bottom of the float 35 and which carries, extending therefrom, an alignment spring 39 adapted to maintain the encompassed portion of the fishing line 26 substantially straight whereby to prevent it from kinking in this region.

It should be clearly noted that the float 35 is laterally slotted as indicated at S so as to provide lateral access to the central aperture-defining means 37 whereby to allow a fishing line, such as that shown at 26, to be laterally moved into the aperture-defining means 37 and to be retained in said position by twisting it around the alignment spring 39 until it is centered therein in the manner best shown in FIG. 8. The upper end of the fishing line 26 will, of course, be engaged in the central aperture 31 of the housing means 20 by slipping it through the radial slot means 32 in the manner referred to hereinbefore. It will readily be understood that this provides an arrangement whereby the entire apparatus can be laterally slipped onto the fish line 26 and effectively engaged with respect thereto, thus avoiding the necessity of removing hooks and sinkers and threading the fishing line through the central aperture 37.

It should be noted that the float may be formed of two half portions joined together at a junction along a circular junction edge 40 for convenience in manufacture. However, the float may be of any shape, size, material, or mode of manufacture. Also in the form shown, the float 35 is provided with a plug 41 for use in controllably filling the interior with any desired material having any desired specific gravity and/or buoyancy characteristics.

It should be understood that the apparatus of the present invention is intended primarily for use in deep or bottom fishing and that when so used, the fishing line 26 may be provided with leader means and one or more hooks such as indicated at H whereby bottom or deep water fishing can be accomplished. In this connection, it should be noted that the hook H shown in FIG. 7 would normally be a very substantial distance below the float 35 in actual operation. However, it is shown immediately below the float 35 in FIG. 7 in order to save space on the drawing sheet. It should also be noted that one or more such hooks H may be employed. The additional hooks are not shown for drawing simplification reasons and because the one hook H exemplifies all such hooks that might be employed.

In addition to the use of the apparatus of the present invention for bottom or deep water fishing, it may alternatively or simultaneously be used for surface fishing. As shown in FIG. 7, this may be accomplished by providing the float 35 with a connection element 42 which is adapted to have removably fastened thereto a portion of a buoyant fishing line 43 carrying one or more hooks such as the one shown at the end thereof at 44, which may be suitably baited as indicated at 45. It should be noted that the buoyant fishing line 43 is of the type comprising woven material with bubbles of gas entrapped therein whereby to provide sufficient buoyancy to support it on the surface of the water.

FIG. 10 illustrates a housing 20' identical to the housing 20 shown in the first form of the invention, but provided with a closure or cover 47, which is radially slotted at 49 and centrally apertured at 48 to allow upward egress of a fishing line, such as that shown at 26 in the first form of the invention. In other words, this modification is identical to the first form illustrated except that it is additionally provided with the cover 47.

It should be clearly noted that the term "magnetic elements," as used herein, is intended to mean any pair of elements which magnetically attract each other. In other words, either element may be a permanent magnet, or both may be permanent magnets, or one may be a permanent magnet and the other may be of ferromagnetic material, or vice versa.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Apparatus for controlling the slidable engagement of a fishing float with respect to a fishing line, comprising: housing means provided with two relatively movable magnetic elements in closely adjacent relationship and defining therebetween a through passage for a longitudinal fishing line whereby said longitudinal fishing line member will be frictionally engaged and snubbed in a manner inhibiting longitudinal movement thereof as a direct function of the magnetic attractive force between said two magnetic elements, said housing means being provided with aperture-defining egress means for said longitudinal fishing line, one of said magnetic elements comprising a permanent magnet and bracket means slidably movably mounting same for movement toward and away from the other one of said magnetic elements whereby to controllably adjust the magnetic attractive force therebetween and the degree of frictional snubbing action exerted against the longitudinal fishing line, the other one of said magnetic elements comprising a rotary mounting shaft of non-magnetic material carrying at least partially therearound a curved sheet of ferromagnetic material varying in mass as a function of its circumferential position around said rotary shaft whereby rotation thereof will controllably move a greater or lesser quantity of said curved ferromagnetic sheet of material into closely adjacent position opposite said slidably movably mounted magnetic element comprising a permanent magnet whereby to controllably adjust the magnetic attractive force therebetween and the degree of frictional snubbing action exerted against the longitudinal fishing line.

2. Apparatus of the character defined in claim 1, including means for attaching said housing means to a hollow spherical fishing float with the extended longitudinal fishing line passing through aperture-defining means thereof.

3. Apparatus of the character defined in claim 1, including a hollow spherical fishing float carrying said housing means and being provided with aperture-defining means aligned with the aperture-defining egress means of the housing means receiving and passing therethrough the longitudinal fishing line extending from the opposed magnetic elements.

4. Apparatus of the character defined in claim 3, wherein said float is provided, in aligned relationship with said aperture-defining egress means thereof, with means for maintaining a portion of the longitudinal fishing line extending therefrom in substantially aligned relationship therewith to prevent kinking thereof.

5. Apparatus for controllably slidably engaging a longitudinal member, comprising housing means provided with two relatively movable magnetic elements in closely adjacent relationship and defining therebetween a through passage for a longitudinal member whereby said longitudinal member will be frictionally engaged and snubbed in a manner inhibiting longitudinal movement thereof as a direct function of the magnetic attractive force between said two magnetic elements, one of said magnetic elements comprising a permanent magnet and bracket means slidably movably mounting same for movement toward and away from the other one of said magnetic elements whereby to controllably adjust the magnetic attractive force therebetween and the degree of frictional snubbing action exerted against the longitudinal member, the other one of said magnetic elements comprising a rotary mounting shaft of non-magnetic material carrying at least partially therearound a curved sheet of ferromagnetic material varying in mass as a function of its circumferential position around said rotary shaft whereby rotation thereof will controllably move a greater or less quantity of said curved ferromagnetic sheet of material into closely adjacent position opposite siad slidably movably mounted magnetic element comprising a permanent magnet whereby to controllably adjust the magnetic attractive force therebetween and the degree of frictional snubbing action exerted against the longitudinal member.

References Cited in the file of this patent
UNITED STATES PATENTS 2,281,204    Raymond _____ Apr. 28, 1942
2,647,705    Gilmore _____ Aug. 4, 1953